US010269372B1

(12) United States Patent
Fiedler et al.

(10) Patent No.: US 10,269,372 B1
(45) Date of Patent: Apr. 23, 2019

(54) SYSTEM FOR SOUND ANALYSIS AND RECOGNITION (71) Applicant: United Services Automobile Association, San Antonio, TX (US)

(72) Inventors: Kevin K. Fiedler, Boerne, TX (US); Michael J. Szentes, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 15/240,735

(22) Filed: Aug. 18, 2016

Related U.S. Application Data (60) Provisional application No. 62/232,262, filed on Sep. 24, 2015.

(51) Int. Cl.
| | | |
|---|---|---|
| *G10L 15/00* | (2013.01) | |
| *G10L 21/10* | (2013.01) | |
| *G10L 15/26* | (2006.01) | |
| *G10L 15/06* | (2013.01) | |
| *G06F 17/24* | (2006.01) | |
| *G10L 25/90* | (2013.01) | |

(Continued)

(52) U.S. Cl.
CPC .............. *G10L 21/10* (2013.01); *G06F 3/167* (2013.01); *G06F 17/241* (2013.01); *G10L 15/063* (2013.01); *G10L 15/26* (2013.01); *G10L 25/63* (2013.01); *G10L 25/66* (2013.01); *G10L 25/90* (2013.01); *G10L 15/08* (2013.01); *G10L 17/005* (2013.01)

(58) Field of Classification Search
CPC ....... G10L 15/22; G10L 15/30; G10L 15/265; G10L 15/16; G10L 25/30; G10L 15/20; G10L 25/78; G10L 15/08; G10L 15/1815; G10L 17/005; G10L 17/02
See application file for complete search history.

(56) References Cited

U.S. PATENT DOCUMENTS

| | | | | |
|---|---|---|---|---|
| 6,567,503 | B2 * | 5/2003 | Engelke | ............ H04M 3/42391 |
| | | | | 379/100.09 |
| 7,536,304 | B2 * | 5/2009 | Di Mambro | ............ G06F 21/32 |
| | | | | 704/270 |

(Continued)

*Primary Examiner* — Vu B Hang
(74) *Attorney, Agent, or Firm* — Fish & Richardson P.C.

(57) ABSTRACT

A computer-implemented method for integrating sound data into a telecommunication system, said method comprising receiving, at a processor, one or more sound signals from a telecommunication device of a first user during a conversation with the first user, determining, in real time from the sound signals, one or more qualities of the sound signals for recognition of the sound signals, and displaying a visual representation of the sound signals to a second user. Qualities of the sound signal to be determined include, but are not limited to: a) the words that were spoken b) the intent expressed and their context and c) the sentiment of the speaker. Visual representation of the sound signal to the second user include, but are not limited to: a) specific words that were spoken by the first user b) high level intent expressed by the words and the first users context c) information related to or inferred from the spoken words (e.g. suggested actions to take, factors to consider, representation of the first users sentiment, etc.).

16 Claims, 3 Drawing Sheets

(51) Int. Cl.
*G10L 25/63* (2013.01)
*G10L 25/66* (2013.01)
*G06F 3/16* (2006.01)
G10L 15/08 (2006.01)
G10L 17/00 (2013.01)

(56) References Cited

U.S. PATENT DOCUMENTS

| | | | | |
|---|---|---|---|---|
| 9,965,685 | B2* | 5/2018 | Matsuoka | G06K 9/00771 |
| 2006/0190264 | A1* | 8/2006 | Jaramillo | G06F 21/32 |
| | | | | 704/270.1 |
| 2011/0270609 | A1* | 11/2011 | Jones | H04M 3/56 |
| | | | | 704/235 |
| 2015/0103982 | A1* | 4/2015 | O'Conor | H04M 3/5116 |
| | | | | 379/45 |
| 2015/0163181 | A1* | 6/2015 | Kupsh | H04L 51/10 |
| | | | | 709/206 |
| 2016/0071517 | A1* | 3/2016 | Beaver | G06F 17/279 |
| | | | | 704/9 |

\* cited by examiner

SYSTEM FOR SOUND ANALYSIS AND RECOGNITION

CROSS REFERENCE TO RELATED APPLICATIONS

This application claims priority to U.S. Patent Application Ser. No. 62/232,262 filed Sep. 24, 2015, which is incorporated herein by reference in its entirety.

FIELD OF THE INVENTION

The disclosed embodiments generally relate to sound recognition systems, more specifically to systems for sound analysis and recognition for use in telecommunication.

BACKGROUND OF THE INVENTION

Traditional voice recognition systems can recognize speech using a speech module configured to reduce sound signals into text. While such systems are beneficial for certain textual translations, such systems are limited in functionality and traditionally require a predetermined "voice print" of a speaker/re-speaker and/or the use of a "pitch and catch" type of question/response system to accurately translate sound signals to text. The output of such systems is also limited as a textual representation of the sound signals.

While such systems have been satisfactory in the art, improved sound analysis and recognition systems are needed.

SUMMARY OF THE INVENTION

The purpose and advantages of the below described illustrated embodiments will be set forth in and apparent from the description that follows. Additional advantages of the illustrated embodiments will be realized and attained by the devices, systems and methods particularly pointed out in the written description and claims hereof, as well as from the appended drawings. To achieve these and other advantages and in accordance with the purpose of the illustrated embodiments, in one aspect, a computer-implemented method for integrating sound data into a telecommunication system includes receiving, at a processor, one or more sound signals from a telecommunication device of a first user during a conversation with the first user, determining, in real time from the sound signals, one or more qualities of the sound signals for recognition of the sound signals, and displaying a visual representation of the sound signals to a second user.

Displaying a visual representation of the sound signals can include displaying a textual representation of the sound signals. The method can further include displaying a degree of certainty of accuracy of the textual representation of the sound signals. The method can further include allowing the second user to modify speed of transcription, wherein degree of certainty of accuracy is reduced with increased speed of transcription.

The method can further include constructing a first user voice print for the first user and storing said first user voice print for referencing.

Determining one or more qualities of the sound signals can include determining or setting a context of the conversation. The method can further include creating metadata tags as a function of the context of the conversation such that the metadata tags are displayed to the second user. The metadata tags can include at least one of identifying and/or defining key words or phrases, related topics of conversation, previous related conversations with the first user, social media data of the first user, or intent of the conversation of the first user. The method can further include updating, adding, removing, and/or otherwise modifying the metadata tags as the conversation progresses.

Determining one or more qualities of the sound signals can include determining a tone of the sound signals. In certain embodiments, determining the tone of the sound signals can include determining an emotional state of the user.

Determining one or more qualities of the sound signals can include determining a circumstance of the first user. Determining the circumstance of the first user can include determining an environment of the user. In certain embodiments, determining the circumstance of the first user includes determining a marital state, a parenthood state, a financial state, a health state, and/or an authenticity of the user.

Determining one or more qualities of the sound signals can include determining a location of origination of the sound signals. In certain embodiments, determining one or more qualities of the sound signals includes determining an intent of the first user from the sound signals.

In accordance with at least one aspect of this disclosure, an electronic device can include a memory, a processor operatively connected to the memory, and a transcription module stored on the memory and configured to perform any and/or all suitable portions of a method as described herein. For example, the transcription module can be configured to display a graphical user interface (GUI) to allow the second user to modify speed of transcription, wherein degree of certainty of accuracy is reduced with increased speed of transcription.

BRIEF DESCRIPTION OF THE DRAWINGS

The accompanying appendices and/or drawings illustrate various non-limiting, example, aspects in accordance with the present disclosure.

DETAILED DESCRIPTION OF CERTAIN EMBODIMENTS

The illustrated embodiments are now described more fully with reference to the accompanying drawings wherein like reference numerals identify similar structural/functional features. The illustrated embodiments are not limited in any way to what is illustrated as the illustrated embodiments described below are merely exemplary, which can be embodied in various forms, as appreciated by one skilled in the art. Therefore, it is to be understood that any structural and functional details disclosed herein are not to be interpreted as limiting, but merely as a basis for the claims and as a representation for teaching one skilled in the art to variously employ the discussed embodiments. Furthermore, the terms and phrases used herein are not intended to be limiting but rather to provide an understandable description of the illustrated embodiments.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the illustrated embodiments, exemplary methods and materials are now described.

It must be noted that as used herein and in the appended claims, the singular forms "a", "an," and "the" include plural referents unless the context clearly dictates otherwise. Thus, for example, reference to "a stimulus" includes a plurality of such stimuli and reference to "the signal" includes reference to one or more signals and equivalents thereof known to those skilled in the art, and so forth.

It is to be appreciated the illustrated embodiments discussed below can be a software algorithm, program or code residing on computer useable medium having control logic for enabling execution on a machine having a computer processor. The machine typically includes memory storage configured to provide output from execution of the computer algorithm or program.

As used herein, the term "software" is meant to be synonymous with any code or program that can be in a processor of a host computer, regardless of whether the implementation is in hardware, firmware or as a software computer product available on a disc, a memory storage device, or for download from a remote machine. The embodiments described herein include such software to implement the equations, relationships and algorithms described above. One skilled in the art will appreciate further features and advantages of the illustrated embodiments based on the above-described embodiments. Accordingly, the illustrated embodiments are not to be limited by what has been particularly shown and described, except as indicated by the appended claims.

Figure 1:
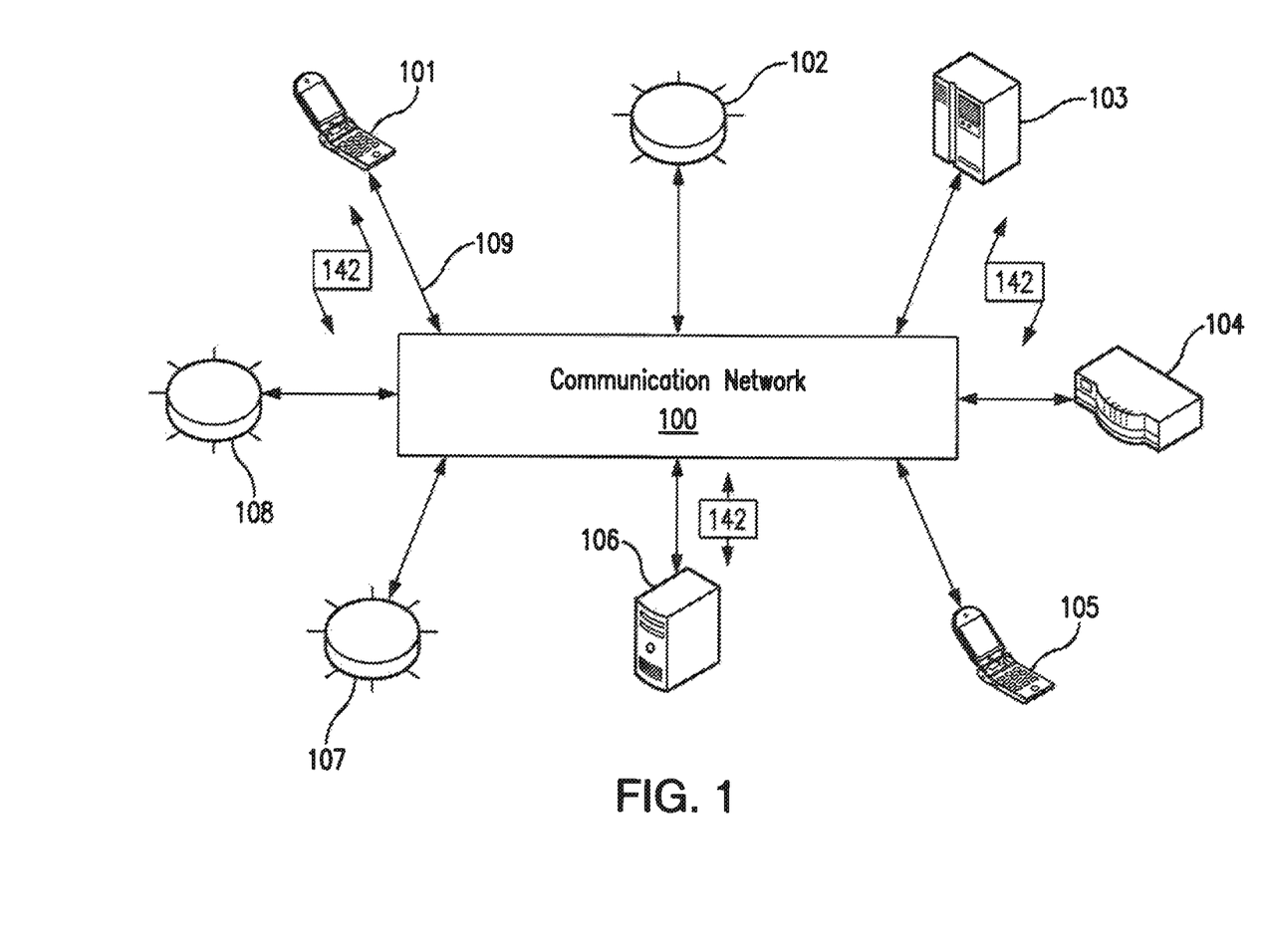
FIG. 1 illustrates an example communication network in accordance with this disclosure.

Turning now descriptively to the drawings, in which similar reference characters denote similar elements throughout the several views, FIG. 1 depicts an exemplary communications network 100 in which below illustrated embodiments may be implemented.

It is to be understood a communication network 100 can be a geographically distributed collection of nodes interconnected by communication links and segments for transporting data between end nodes, such as personal computers, work stations, smart phone devices, tablets, televisions, sensors and or other devices such as automobiles, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others.

FIG. 1 is a schematic block diagram of an example communication network 100 illustratively comprising nodes/devices 101-108 (e.g., sensors 102, client computing devices 103, smart phone devices 105, web servers 106, routers 107, switches 108, and the like) interconnected by various methods of communication. For instance, the links 109 may be wired links or may comprise a wireless communication medium, where certain nodes are in communication with other nodes, e.g., based on distance, signal strength, current operational status, location, etc. Moreover, each of the devices can communicate data packets (or frames) 142 with other devices using predefined network communication protocols as will be appreciated by those skilled in the art, such as various wired protocols and wireless protocols etc., where appropriate. In this context, a protocol consists of a set of rules defining how the nodes interact with each other. Those skilled in the art will understand that any number of nodes, devices, links, etc. may be used in the computer network, and that the view shown herein is for simplicity. Also, while the embodiments are shown herein with reference to a general network cloud, the description herein is not so limited, and may be applied to networks that are hardwired.

As will be appreciated by one skilled in the art, aspects of this disclosure may be embodied as a system, method or computer program product. Accordingly, aspects of this disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure are described below with reference to flowchart illustrations and/or block diagrams of methods, apparatus (systems) and computer program products according to embodiments of disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
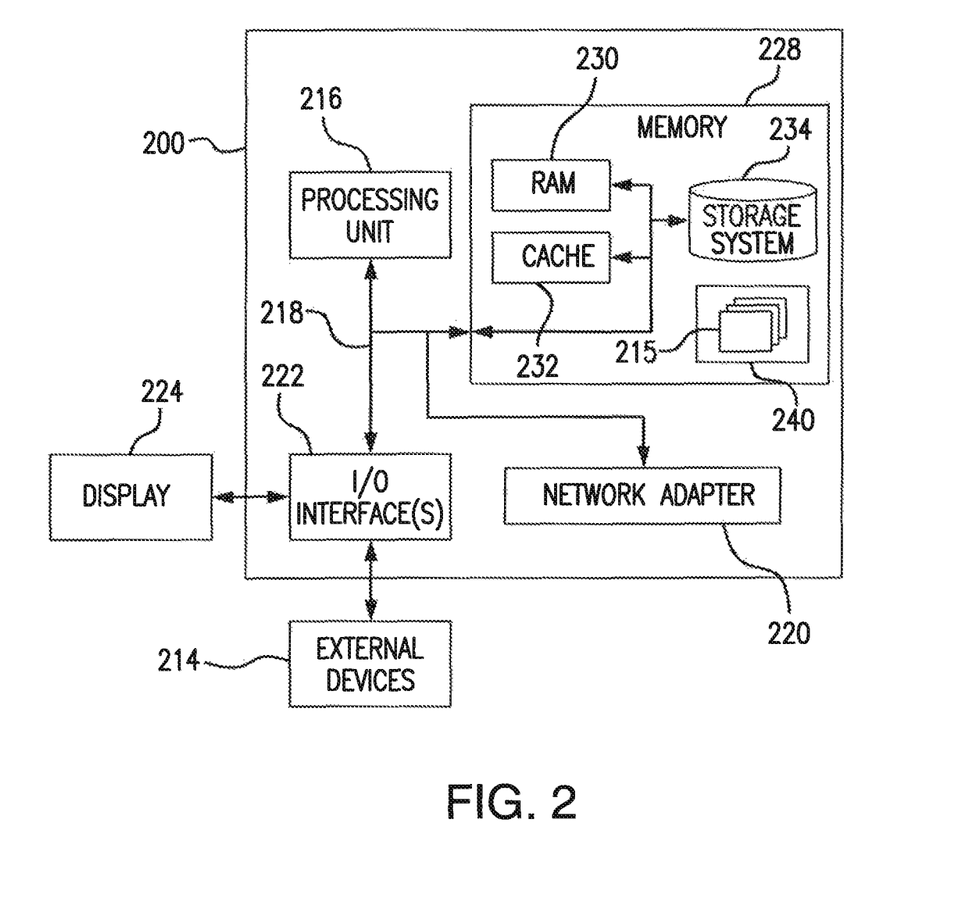
FIG. 2 illustrates an example network device/node in accordance with this disclosure.

FIG. 2 is a schematic block diagram of an example network computing device 200 (e.g., client computing device 103, server 106, etc.) that may be used (or components thereof) with one or more embodiments described herein, e.g., as one of the nodes shown in the network 100. As explained above, in different embodiments these various devices are configured to communicate with each other in any suitable way, such as, for example, via communication network 100.

Device 200 is intended to represent any type of computer system capable of carrying out the teachings of various embodiments of this disclosure. Device 200 is only one example of a suitable system and is not intended to suggest any limitation as to the scope of use or functionality of embodiments of disclosure described herein. Regardless, computing device 200 is capable of being implemented and/or performing any of the functionality set forth herein.

Computing device 200 is operational with numerous other general purpose or special purpose computing system environments or configurations. Examples of well-known computing systems, environments, and/or configurations that may be suitable for use with computing device 200 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, and distributed data processing environments that include any of the above systems or devices, and the like.

Computing device 200 may be described in the general context of computer system-executable instructions, such as program modules, being executed by a computer system. Generally, program modules may include routines, programs, objects, components, logic, data structures, and so on that perform particular tasks or implement particular abstract data types. Computing device 200 may be practiced in distributed data processing environments where tasks are performed by remote processing devices that are linked through a communications network. In a distributed data processing environment, program modules may be located in both local and remote computer system storage media including memory storage devices.

Device 200 is shown in FIG. 2 in the form of a general-purpose computing device. The components of device 200 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 200 typically includes a variety of computer system readable media. Such media may be any available media that is accessible by device 200, and it includes both volatile and non-volatile media, removable and non-removable media.

System memory 228 can include computer system readable media in the form of volatile memory, such as random access memory (RAM) 230 and/or cache memory 232. Computing device 200 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of disclosure.

Program/utility 240, having a set (at least one) of program modules 215, such as underwriting module, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 215 generally carry out the functions and/or methodologies of embodiments of disclosure as described herein.

Device 200 may also communicate with one or more external devices 214 such as a keyboard, a pointing device, a display 224, etc.; one or more devices that enable a user to interact with computing device 200; and/or any devices (e.g., network card, modem, etc.) that enable computing device 200 to communicate with one or more other computing devices. Such communication can occur via Input/Output (I/O) interfaces 222. Still yet, device 200 can communicate with one or more networks such as a local area network (LAN), a general wide area network (WAN), and/or a public network (e.g., the Internet) via network adapter 220. As depicted, network adapter 220 communicates with the other components of computing device 200 via bus 218. It should be understood that although not shown, other hardware and/or software components could be used in conjunction with device 200. Examples, include, but are not limited to: microcode, device drivers, redundant processing units, external disk drive arrays, RAID systems, tape drives, and data archival storage systems, etc.

FIGS. 1 and 2 are intended to provide a brief, general description of an illustrative and/or suitable exemplary environment in which embodiments of this disclosure may be implemented. FIGS. 1 and 2 are exemplary of a suitable environment and are not intended to suggest any limitation as to the structure, scope of use, or functionality of an embodiment of this disclosure. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

Figure 3:
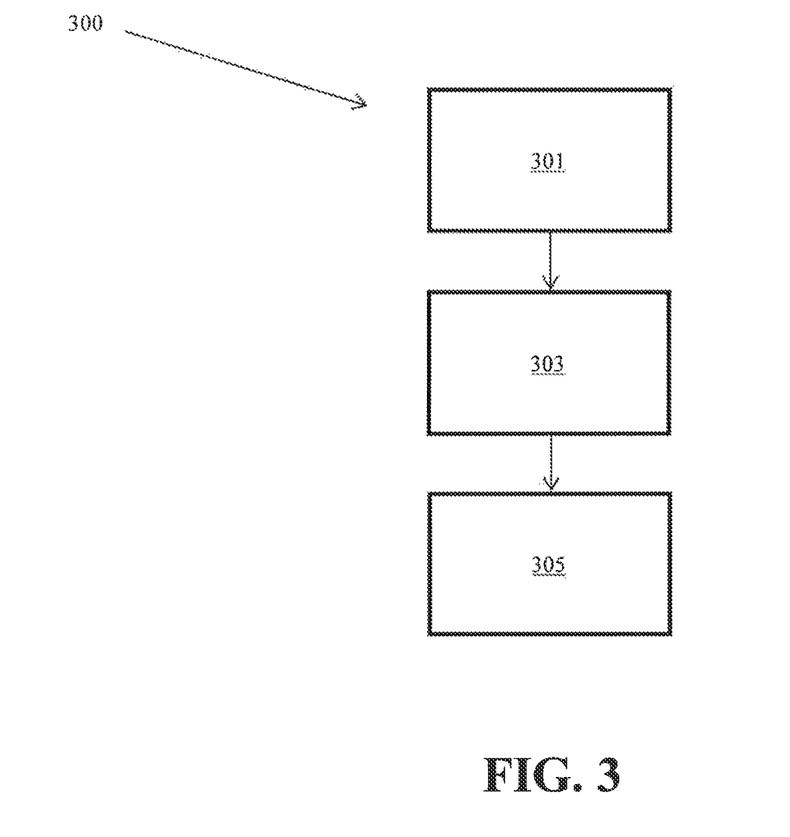
FIG. 3 illustrates an embodiment of a method in accordance with this disclosure.

With the exemplary communication network 100 (FIG. 1) and computing device 200 (FIG. 2) being generally shown and discussed above, description of certain illustrated embodiments of this disclosure will now be provided. With reference now to FIG. 3, shown is a flow chart demonstrating implementation of the various exemplary embodiments. It is noted that the order of steps shown in FIG. 3 is not required, so in principle, the various steps may be performed out of the illustrated order. Also certain steps may be skipped, different steps may be added or substituted, or selected steps or groups of steps may be performed in a separate application following the embodiments described herein.

In accordance with this disclosure, referring to FIG. 3, a computer-implemented method 300 for integrating sound data into a telecommunication system includes receiving, e.g., at block 301, at a processor, one or more sound signals from a telecommunication device of a first user (e.g., a member of an insurance carrier) during a conversation with the first user. The method 300 further includes determining, e.g., at block 303, one or more qualities of the sound signals for recognition of the sound signals. The one or more qualities can be determined in real time from the sound signals. It is to be appreciated and understood qualities of the sound signal to be determined include, but are not limited to: a) the words that were spoken b) the intent expressed and their context and c) the sentiment of the speaker. Visual representation of the sound signal to the second user include, but are not limited to: a) specific words that were spoken by the first user b) high level intent expressed by the words and the first users context c) information related to or inferred from the spoken words (e.g. suggested actions to take, factors to consider, representation of the first users sentiment, etc.).

The method 300 also includes displaying, e.g., at block 305 a visual representation of the sound signals to a second user (e.g., a member services representative). In certain embodiments, displaying a visual representation of the sound signals can include displaying a textual representation of the sound signals (e.g., text transcription of words spoken by the first user). The method 300 can also include displaying a degree of certainty of accuracy of the textual representation of the sound signals (e.g., a displayed percentage adjacent to each transcribed word, phrase, or sentence).

The method 300 can further include allowing the second user to modify a speed of transcription. However, such a modification may affect the degree of certainty of accuracy (e.g., accuracy may be reduced with increased speed of transcription which can be balanced as desired by the second user). The speed/latency of transcription can also be displayed to the second user to have an indication of transcription latency versus accuracy.

The method 300 can further include constructing a first user voice print for the first user and storing said first user voice print for referencing. For example, a voice print may not be available for a new member of an insurance carrier, or such a stored voice print may be limited in data points to greatly improve accuracy of text transcription. Each time a particular member calls and is properly identified (e.g., via voice recognition or based on any other suitable data such as the phone number calling in or name given), the sound signals from the member can be stored in reference for use later. Thus, the system in accordance with an illustrated embodiment, self-learns a member's voice print merely logging into the system (e.g., entering ID information) and voice interaction with the system. Therefore, the member does not have to repeat aloud any coined terms or phrases (e.g., the little red fox ran over . . . ) in order for the system to understand and subsequently recognize the member's voice print.

In certain embodiments, it is contemplated that the voice print of a member can be created, edited, updated, or otherwise modified and accessed in real time allowing quick learning and improved transcription.

In certain embodiments, determining one or more qualities of the sound signals can include determining or setting a context of the conversation. For example, certain key word triggers like "claim", "policy", "change", or similar words can indicate that a member of an insurance carrier would like to discuss their insurance policy, a pending claim, and/or a change to their policy. Such recognition of context can be used to improve the text transcription of the sound signals by listening to the sound signals for known words that frequently arise in such conversations (e.g., stored in a topic word bank).

The method 300 can further include creating metadata tags as a function of the context of the conversation such that the metadata tags are displayed to the second user. The metadata tags can include at least one of identifying and/or defining key words or phrases, related topics of conversation, previous related conversations with the first user (e.g., from a previous call), social media data of the first user (e.g., retrieved by a social media scrubbing module), or intent of the conversation of the first user (e.g., to obtain/update a policy, to defraud the insurer, to complain). The method can further include updating, adding, removing, and/or otherwise modifying the metadata tags as the conversation progresses (e.g., to remove metadata that has been determined to be irrelevant). In certain embodiments, a dialect can be detected and used to determine the meaning of certain words or phrases, or identify cultural or other sensitivities/idiosyncrasies that the second user should be aware of (e.g., words and/or phrases to avoid of certain groups of people).

In certain embodiments, determining one or more qualities of the sound signals can include determining a tone of the sound signals. In certain embodiments, determining the tone of the sound signals can include determining an emotional state of the user. For example, the emotional state of a member can be determined by analyzing speech patterns, the frequency of the sound signals from the member (the rate of speech), amplitude and/or auditory pitch of the sound signals (e.g., high pitch yelling, low pitch droning). The emotional state of the first user can be displayed to the second user and can be updated in real time as the conversation between the first user and the second user progresses.

In certain embodiments, determining one or more qualities of the sound signals can include determining a circumstance of the first user. Determining the circumstance of the first user can include determining an environment of the user. In certain embodiments, determining the circumstance of the first user includes, but is not limited to, determining a marital state, a parenthood state, a financial state, a health state, a lifestyle change, a residence move, a job change, a new activity (e.g., gym membership), and/or an authenticity of the user. For example, a police siren, ambulance siren, yelling, or other emergency sounds can indicate that an accident or other perilous situation as or is occurring around the first user. Sounds of a newborn baby crying can indicate that the first user may want to update their policy or be offered a new plan by the second user. Coughing, wheezing, medical equipment sounds, or other vocal problems can indicate health issues that may want to be addressed by an insurance policy.

Determining one or more qualities of the sound signals can include determining a location of origination of the sound signals (e.g., via a GPS location of a transmitting device, via a dialect). In certain embodiments, determining one or more qualities of the sound signals includes determining an intent of the first user from the sound signals. For example, it is contemplated that, while the first user is on hold, the first user may still be listened to for, e.g., any of the above types of sound signals, or more. The first user may reveal a fraudulent purpose while on hold, or may discuss other issues such as challenges with saving money or other motivation to defraud an insurer. Such an indication of potential fraudulence can be displayed to the second user.

In accordance with at least one aspect of this disclosure, an electronic device (e.g., device 200) can include a transcription module stored on the memory and configured to perform any and/or all suitable portions of a method as described herein. For example, the transcription module can be configured to display a graphical user interface (GUI) to allow the second user to modify speed of transcription, wherein a degree of certainty of accuracy can be reduced with increased speed of transcription.

It is to be understood that the above-described arrangements are only illustrative of the application of the principles of the illustrated embodiments. Numerous modifications and alternative arrangements may be devised by those skilled in the art without departing from the scope of the illustrated embodiments, and the appended claims are intended to cover such modifications and arrangements.

What is claimed is:

1. A computer-implemented method for integrating sound data into a telecommunication system, the method comprising:
   receiving, at a processor, one or more sound signals from a telecommunication device of a first user during a conversation with the first user;
   retrieving, from a data store, a voice print of the first user based on the sound signals, the voice print generated during a previous voice interaction by the first user;
   processing the sound signals and the voice print to determine a textual representation of the sound signals, and one or more qualities of the sound signals for recognition of the sound signals, wherein the one or more qualities of the sound signals includes a real-time circumstance of the first user; and
   displaying a visual representation of the sound signals and the determined circumstance to a second user, wherein the visual representation of the sound signals includes the textual representation of the sound signals, and wherein displaying the visual representation includes displaying a degree of certainty of accuracy of each transcribed element included in the textual representation.

2. The method of claim 1, further comprising:
   receiving, from the second user, a modification to a speed of transcription, wherein the degree of certainty of accuracy can be reduced to increase the speed of transcription.

3. The method of claim 1, further comprising:
   modifying the voice print of the first user based on the sound signals and the one or more qualities of the sound signals; and
   persisting the voice print in the data store for referencing.

4. The method of claim 1, further comprising:
   creating metadata tags as a function of the real-time circumstance; and
   displaying the metadata tags to the second user.

5. The method of claim 4, wherein the metadata tags include at least one of identifying or defining key words or phrases, related topics of conversation, previous related conversations with the first user, social media data of the first user, or intent of the conversation of the first user.

6. The method of claim 4, further comprising updating, adding, removing, or otherwise modifying the metadata tags as the conversation progresses with a visual tool used by the second user.

7. The method of claim 1, wherein the one or more qualities of the sound signals includes a tone of the first user during the conversation with the first user.

8. The method of claim 7, wherein the tone of the of the first user during the conversation includes an emotional state of the first user during the conversation with the first user, and wherein the visual representation of the sound signals includes the emotional state.

9. The method of claim 1, wherein the one or more qualities of the sound signals includes a location of origination of the sound signals, and wherein the visual representation of the sound signals includes the location of origination.

10. The method of claim 1, wherein the one or more qualities of the sound signals includes an intent of the first user from the sound signals, and wherein the visual representation of the sound signals includes the intent.

11. An electronic device, comprising:
a memory;
a processor operatively connected to the memory; and
a transcription module stored on the memory and configured to:
- receive, at the processor, one or more sound signals from a telecommunication device of a first user during a conversation with the first user;
- retrieve, from a data store, a voice print of the first user based on the sound signals, the voice print generated during a previous voice interaction by the first user;
- process the sound signals and the voice print to determine a textual representation of the sound signals, and one or more qualities of the sound signals for recognition of the sound signals, wherein the one or more qualities of the sound signals includes a real time circumstance of the first user; and
- display a visual representation of the sound signals and the determined circumstance to a second user, wherein the visual representation of the sound signals includes the textual representation of the sound signals, and wherein displaying the visual representation includes displaying a degree of certainty of accuracy of each transcribed element included in the textual representation.

12. The electronic device of claim 11, wherein the transcription module is configured to display a graphical user interface (GUI) to allow the second user to modify a speed of transcription, wherein the degree of certainty of accuracy is reduced with an increased speed of transcription.

13. The method of claim 1, wherein the previous voice interaction does not include a coined term or phrase.

14. The method of claim 1, wherein the real-time circumstance includes an accident or other perilous situation is occurring around the first user.

15. The method of claim 1, wherein the real-time circumstance includes a presence of a baby around the first user.

16. The method of claim 1, wherein the real-time circumstance includes the first user experiencing health issues.

\* \* \* \* \*

UNITED STATES PATENT AND TRADEMARK OFFICE
CERTIFICATE OF CORRECTION

PATENT NO. : 10,269,372 B1  
APPLICATION NO. : 15/240735  
DATED : April 23, 2019  
INVENTOR(S) : Kevin K. Fiedler and Michael J. Szentes Page 1 of 1

It is certified that error appears in the above-identified patent and that said Letters Patent is hereby corrected as shown below:

In the Claims

Column 10, Line 53, Claim 8, delete "of the of the" and insert -- of the --, therefor.

Signed and Sealed this  
Sixth Day of August, 2019

Andrei Iancu  
*Director of the United States Patent and Trademark Office*